United States Patent
San Martin et al.

(10) Patent No.: US 7,888,941 B2
(45) Date of Patent: Feb. 15, 2011

(54) PERMITTIVITY MEASUREMENTS WITH OIL-BASED MUD IMAGING TOOL

(75) Inventors: Luis E. San Martin, Houston, TX (US); William J. Schaecher, Houston, TX (US); Myrick L. Monroe, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 288 days.

(21) Appl. No.: 12/065,292

(22) PCT Filed: Nov. 6, 2006

(86) PCT No.: PCT/US2006/043244

§ 371 (c)(1),
(2), (4) Date: Feb. 29, 2008

(87) PCT Pub. No.: WO2007/056320

PCT Pub. Date: May 18, 2007

(65) Prior Publication Data

US 2008/0272789 A1    Nov. 6, 2008

Related U.S. Application Data

(60) Provisional application No. 60/733,761, filed on Nov. 4, 2005.

(51) Int. Cl.
*G01V 3/24* (2006.01)
*G01V 3/20* (2006.01)

(52) U.S. Cl. .................. 324/366; 324/355; 324/347

(58) Field of Classification Search ............. 324/347, 324/354, 355, 360, 364, 366, 367, 373, 374
See application file for complete search history.

(56) References Cited

U.S. PATENT DOCUMENTS

| 3,470,457 | A | | 9/1969 | Howlett |
| 4,361,808 | A | * | 11/1982 | Kern et al. .................. 324/366 |
| 4,567,759 | A | * | 2/1986 | Ekstrom et al. .......... 73/152.02 |
| 5,339,037 | A | | 8/1994 | Bonner |

(Continued)

FOREIGN PATENT DOCUMENTS

EP     0105801 A2     4/1984

(Continued)

OTHER PUBLICATIONS

AU First Examiner'S Report, dated Aug. 7, 2009, Appl No. 2006311719, "Permittivity Measurements with Oil-Based Mud Imaging Tool", filed Nov. 6, 2006, 2 pgs.

(Continued)

Primary Examiner—Kenneth J Whittington
(74) Attorney, Agent, or Firm—Krueger Iselin LLP

(57) ABSTRACT

Oil-based mud imaging systems and methods that measure formation permittivity. In some embodiments, disclosed logging systems include a logging tool in communication with surface computing facilities. The logging tool is provided with a sensor array having at least two voltage electrodes positioned between at least two current electrodes that create an electric field in a borehole wall, and is further provided with electronics coupled to the voltage electrodes to determine a differential voltage magnitude and phase. From the magnitude and phase, formation resistivity and permittivity measurements can be determined and used to construct a borehole wall image.

15 Claims, 6 Drawing Sheets

U.S. PATENT DOCUMENTS

| | | | |
|---|---|---|---|
| 5,396,175 A * | 3/1995 | Seeman | 324/375 |
| 5,570,024 A | 10/1996 | Vail et al. | |
| 5,596,534 A | 1/1997 | Manning | |
| 6,023,168 A | 2/2000 | Minerbo | |
| 6,191,588 B1 | 2/2001 | Chen | |
| 6,348,796 B2 | 2/2002 | Evans et al. | |
| 6,396,276 B1 * | 5/2002 | Van Steenwyk et al. | 324/366 |
| 6,564,883 B2 | 5/2003 | Fredericks et al. | |
| 6,600,321 B2 | 7/2003 | Evans | |
| 6,626,251 B1 | 9/2003 | Sullivan et al. | |
| 6,636,406 B1 | 10/2003 | Anthony | |
| 6,891,377 B2 | 5/2005 | Cheung et al. | |
| 7,109,719 B2 | 9/2006 | Fabris et al. | |
| 7,119,544 B2 | 10/2006 | Hayman et al. | |
| 7,242,194 B2 | 7/2007 | Hayman et al. | |
| 7,579,841 B2 | 8/2009 | San Martin et al. | |
| 2003/0222651 A1 | 12/2003 | Tabanou | |
| 2005/0067190 A1 | 3/2005 | Tabanou | |
| 2005/0179437 A1 | 8/2005 | Hayman et al. | |
| 2007/0046291 A1 | 3/2007 | Itskovich | |
| 2007/0103161 A1 | 5/2007 | San Martin et al. | |

FOREIGN PATENT DOCUMENTS

| | | |
|---|---|---|
| EP | 1035299 | 9/2000 |
| WO | WO2005/059285 | 6/2005 |

OTHER PUBLICATIONS

Millman, Jacob, "Microelectronics; Digital and Analog Circuits and Systems", McGraw-Hill, Figures 16-8, 16-10(a), 16-11, 17028, (1979), 573-577 and 654.

PCT International Search Report and Written Opinion, dated Dec. 5, 2007, Appl No. PCT/us06/43244, "Permittivity Measurements with Oil-Based Mud Imaging Tool", filed Nov. 6, 2006, 8 pgs.

US Advisory Action, dated Apr. 17, 2009, U.S. Appl. No. 11/469,859, "Standoff Compensation for Imaging in Oil-Based Muds", filed Sep. 2, 2006, 3 pgs.

US Final Office Action, dated Dec. 22, 2008, U.S. Appl. No. 11/469,859, "Standoff Compensation for Imaging in Oil-Based Muds", filed Sep. 2, 2006, 8 pgs.

US Non-Final Office Actio, dated Jun. 25, 2008, U.S. Appl. No. 11/422,135, "Oil Based Mud Imaging Tool with Common Mode Voltage Compensation", filed Jun. 5, 2006, 11 pgs.

US Non-Final Office Action, dated May 18, 2010, U.S. Appl. No. 12/065,292, Permittivity Measurements with Oil-Based Mud Imaging Tool, 13 pgs.

US Non-Final Office Action, dated Aug. 25, 2008, U.S. Appl. No. 11/469,859, "Standoff Compensation for Imaging in Oil-Based Muds", filed Sep. 2, 2006, 10 pgs.

US Non-Final Office Action, dated Dec. 22, 2008 U.S. Appl. No. 11/422,135, "Oil Based Mud Imaging Tool with Common Mode Voltage Compensation", filed Jun. 5, 2006, 7 pgs.

UK Examination Report, dated Feb. 25, 2010, Appl No. GB0723889.2, 3 pgs.

* cited by examiner

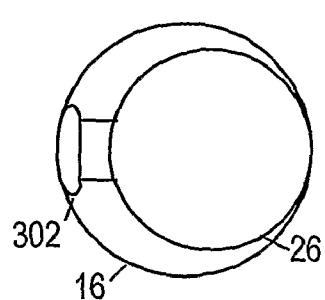 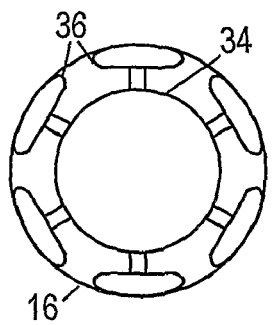
FIG. 3   FIG. 4
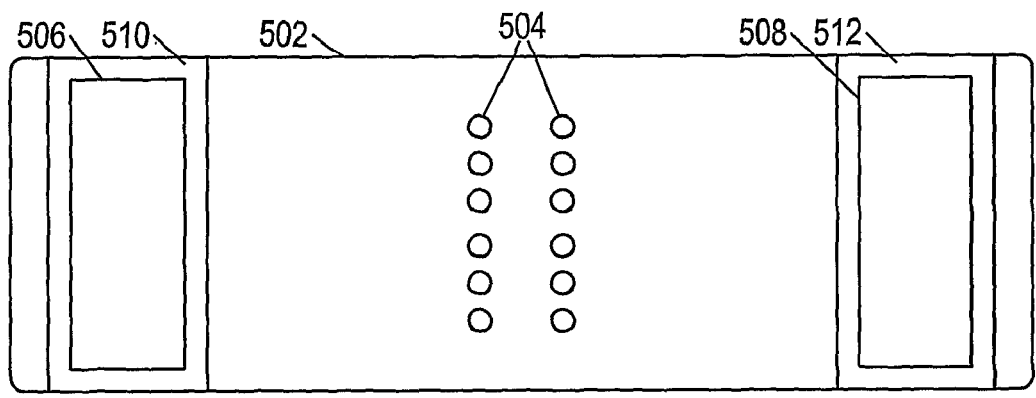
FIG. 5
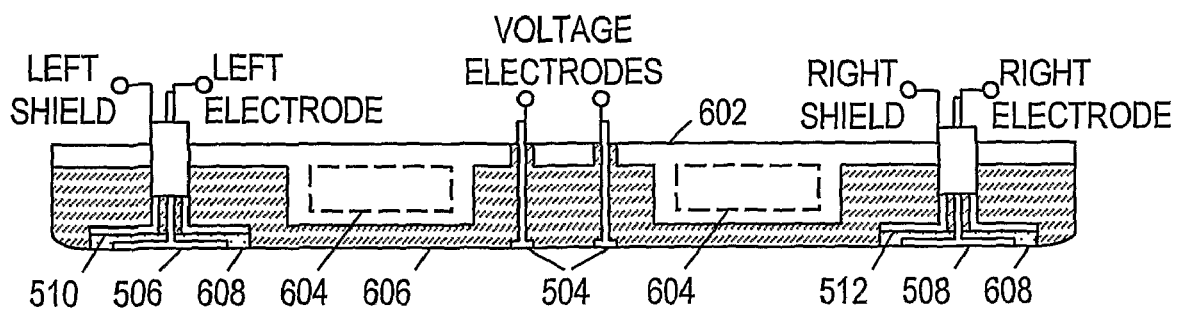
FIG. 6

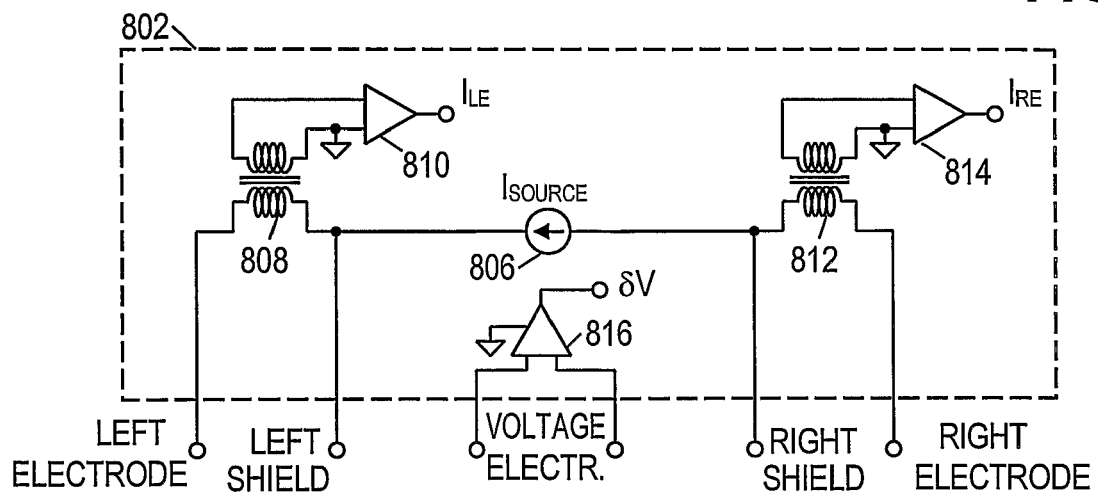
FIG. 7
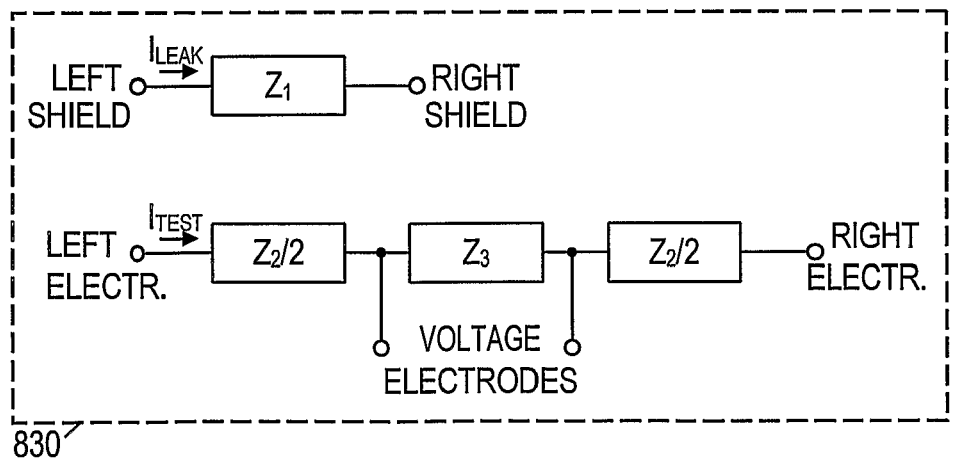
FIG. 8A
FIG. 8B

PERMITTIVITY MEASUREMENTS WITH OIL-BASED MUD IMAGING TOOL

CROSS-REFERENCE TO RELATED APPLICATIONS

The present application claims priority to Provisional U.S. Application Ser. No. 60/733,761, filed Nov. 4, 2005.

BACKGROUND

Modern oil field operations demand a great quantity of information relating to the parameters and conditions encountered downhole. Because drillers and operators are forced to operate remotely from the underground formations and reservoirs they wish to exploit, their access to relevant information is limited. Consequently, there is a demand for tools that provide new types of information, more accurate information, or more efficient collection of information. Examples of information that may be collected includes characteristics of the earth formations traversed by the borehole, and data relating to the size and configuration of the borehole itself. This information is usually recorded and displayed in the form of a log, i.e. a graph of the measured parameter as a function of tool position or depth. The collection of information relating to conditions downhole, which commonly is referred to as "logging", can be performed by several methods including wireline logging and "logging while drilling" (LWD).

In wireline logging, a probe or "sonde" is lowered into the borehole after some or all of a well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated, thereby enabling measurements of the formation while it is less affected by fluid invasion. While LWD measurements are desirable, drilling operations create an environment that is generally hostile to electronic instrumentation, telemetry, and sensor operations.

In these and other logging environments, it is desirable to construct an image of the borehole wall. Among other things, such images reveal the fine-scale structure of the penetrated formations. The fine-scale structure includes stratifications such as shale/sand sequences, fractures, and non-homogeneities caused by irregular cementation and variations in pore size. Orientations of fractures and strata can also be identified, enabling more accurate reservoir flow modeling.

Borehole wall imaging can be accomplished in a number of ways, but micro-resistivity tools have proven to be effective for this purpose. Micro-resistivity tools measure borehole surface resistivity on a fine scale. The resistivity measurements can be converted into pixel intensity values to obtain a borehole wall image. However, oil-based muds can inhibit such measurements due to the high resistivity of the mud and the variability of the contact impedance due to variable standoff. U.S. Pat. No. 6,191,588 (Chen) discloses an imaging tool for use in oil-based muds. Chen's resistivity tool employs at least two pairs of voltage electrodes positioned on a non-conductive surface between a current source electrode and a current return electrode. At least in theory, the separation of voltage and current electrodes eliminates the oil-based mud's effect on voltage electrode measurements, enabling at least qualitative measurements of formation resistivity.

BRIEF DESCRIPTION OF THE DRAWINGS

In the following detailed description, reference will be made to the accompanying drawings, in which:

FIG. 3 shows an illustrative first logging tool configuration;

FIG. 4 shows an illustrative second logging tool configuration;

FIG. 5 shows a front view of an illustrative sensor pad;

FIG. 6 shows a cross section of the illustrative sensor pad;

FIG. 7 shows an illustrative schematic of the sensor pad;

FIG. 8A shows an illustrative schematic of a complex-valued impedance;

FIG. 8B shows an illustrative equivalent circuit model for a formation;

The drawings show illustrative invention embodiments that will be described in detail. However, the description and accompanying drawings are not intended to limit the invention to the illustrative embodiments, but to the contrary, the intention is to disclose and protect all modifications, equivalents, and alternatives falling within the spirit and scope of the appended claims.

DETAILED DESCRIPTION

Disclosed herein are various logging methods and systems that measure voltage magnitude and phase of formation responses from a borehole filled with a nonconductive fluid such as an oil-based mud. In some embodiments, disclosed logging systems include a logging tool in communication with surface computing facilities such as a personal computer, server, or digital signal processing board, or some other form of computing circuit. The logging tool is provided with a sensor array having at least two voltage electrodes positioned between at least two current electrodes that create an electric field in a borehole wall, and is further provided with an electronic circuit coupled to the voltage electrodes to determine a differential voltage magnitude and phase. From the differential voltage measurements and the measured current flow, the computing facilities can determine compensated borehole wall resistivities and permittivities as a function of depth and azimuth and may display the resistivity or permittivity as a borehole wall image.

Figure 1:
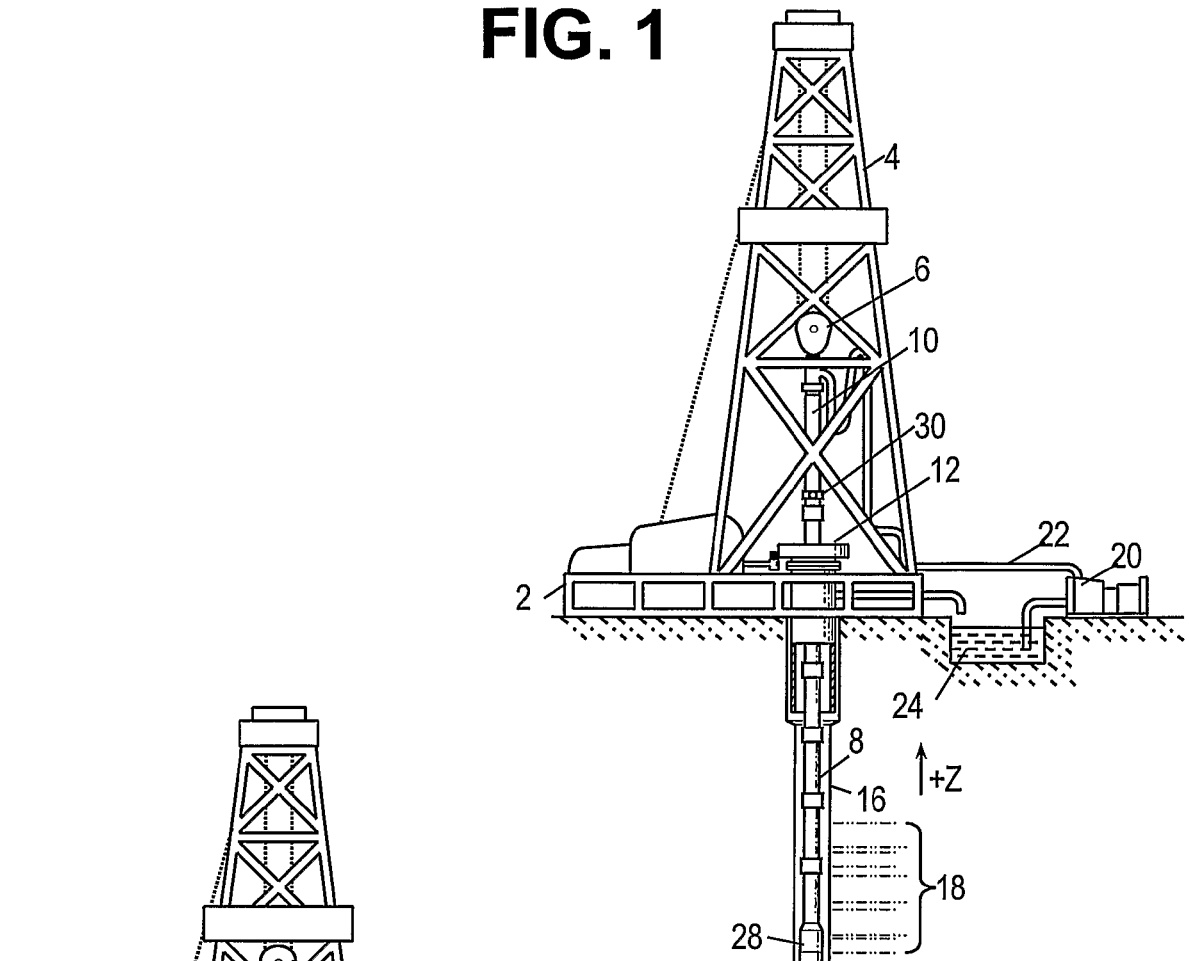
FIG. 1 shows an illustrative logging while drilling (LWD) environment.

FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

A LWD resistivity imaging tool 26 is integrated into the bottom-hole assembly near the bit 14. As the bit extends the borehole through the formations, logging tool 26 collects measurements relating to various formation properties as well as the tool orientation and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface.

Figure 2:
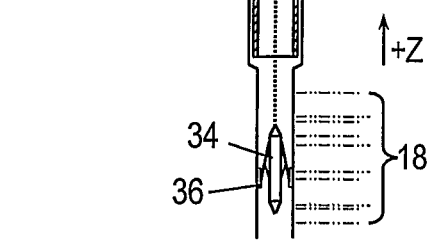
FIG. 2 shows an illustrative wireline logging environment.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool.

FIG. 3 shows a cross-sectional view of LWD resistivity imaging tool 26 in a borehole 16. A biasing mechanism 302 de-centralizes tool 26 to minimize the standoff between the tool's sensors and the borehole wall. The tool's sensors may be located in a pad on biasing mechanism 302, or alternatively the sensors may be located in the main body of the tool opposite the biasing mechanism. As the tool 26 rotates and progresses downhole at the drilling rate, the sensors will trace a helical path on the borehole wall. Orientation sensors within the tool may be used to associate the resistivity measurements with the sensors' positions on the borehole wall. Surface computing facilities may collect resistivity measurements, orientation (azimuth) measurements, and tool position measurements, and may process the collected measurements to create a resistivity image of the borehole wall.

FIG. 4 shows a cross-sectional view of the wireline resistivity imaging tool 34 in a borehole 16. (Some LWD imaging tool embodiments may be constructed with a similar configuration.) Sensing pads 36 are deployed against the borehole wall to minimize standoff. Multiple pads may be used to obtain measurements over a greater fraction of the borehole's circumference. In some embodiments, the pads are provided in axially-offset groups to increase circumferential coverage without undue crowding in the undeployed configuration.

In the logging scenarios described above with respect to FIGS. 1 and 2, the drilling fluid present in the borehole is an electrically nonconductive fluid such as an oil-based mud. Some of the fluid may mix with drill cuttings or material from the borehole walls to form a viscous semi-solid layer on the borehole walls. This layer is commonly termed "mudcake", and it prevents intimate contact between logging sensors and uncontaminated formation material. In addition, motion of the logging instruments may create a fluid flow layer that further separates the logging sensors from the uncontaminated formation materials.

The mudcake and fluid flow layers have a very low conductivity, which creates some difficulty for high-resolution measurements of borehole wall resistivity. The mudcake creates additional problems where low resistivity formations are measured, because the current flow into the formation may be relatively small and in turn generates an extremely small voltage difference that is difficult to measure. Measurements through the low-conductivity layers may be improved by: (1) using an alternating current; (2) separating the voltage electrodes in order to increase the signal (at the cost of degrading spatial resolution); and (3) using a source current with a higher operating frequency.

FIG. 5 shows the face of an illustrative sensor pad 502 having six pairs of voltage electrodes 504 positioned between current electrodes 506 and 508. In practice, the sensor pads may be provided with additional voltage and current electrodes, and in fact may operate on multiple axes. With uniaxial sensor pads such as pad 502, the length of the sensor pad is kept parallel to the long axis of tool 34. The distance between the current electrodes 506, 508 controls the depth of investigation, with greater distances providing greater depths of investigation. The distances between the voltage electrodes 504 controls the spatial resolution of the tool, with smaller distances providing higher resolutions. Behind each of the current electrodes 506, 508 is a corresponding conductive shield 510, 512, which may alternatively be termed a "guard electrode". The shields ("guard electrodes") may be maintained at the same potential as the corresponding current electrode so as to minimize any leakage currents from the current electrodes.

A cross-section of the illustrative sensor pad 502 is shown in FIG. 6. Sensor pad 502 comprises a metal substrate 602 to provide the pad with the needed rigidity and strength. The metal substrate 602 may include cavities 604 to hold sensor circuitry. For illustrative purposes, the electrode feeds are shown passing through the sensor pad 502, but the electrode feeds may alternatively connect to the sensor circuitry in cavities 604 or in a central cavity (not shown).

In some embodiments, metal substrate 602 comprises steel. The face of metal substrate 602 is covered with an insulating layer 606, which in some embodiments comprises a polyetheretherketone (PEEK) material. Current electrodes 506 and 508 are embedded on the face of the insulating layer 606. Shields 510 and 512 separate the current electrodes 506 and 508 from the body of pad 502, and the lines that feed current electrodes 506, 508 are preferably also shielded, possibly with the line shields in a coaxial cable or triaxial cable configuration. In some embodiments, shields are also provided for the voltage electrodes and voltage electrode feeds. Separating the current electrodes from the electrode shields are insulating inserts 608, which in some embodiments comprise a PEEK material.

At higher measurement frequencies, capacitive coupling to the metal substrate creates leakage currents. Such leakage currents can severely impair permittivity measurements. To enable measurements at such frequencies, the geometric design of the pad should be tailored to minimize capacitive coupling (e.g., by increasing the thickness of the insulating materials). Moreover the use of guard electrodes, particularly when combined with a current sensing design that excludes current flow from the guard electrodes, is particularly effective at minimizing the effects of current leakage.

FIG. 7 shows a schematic for the measurement circuitry 802 of the illustrative sensor pad. Measurement circuitry 802 couples to the voltage electrodes, current electrodes, and the electrode shields. The various electrodes and shields in turn couple to the measurement environment that is modeled as an equivalent circuit (discussed below with reference to FIG. 8).

Measurement circuitry 802 comprises a current or voltage source 806 that drives an oscillating current between the current electrodes ("right electrode" and "left electrode"). Source 806 is also coupled between the electrode shields ("right shield" and "left shield") to maintain the shields at approximately the same potential as their corresponding electrodes. Current sensors are coupled to the current electrodes to measure simultaneous current flows from the two current electrodes. In the illustrative embodiment, transformer 808 is coupled between the source and the left current electrode to convert the electrode current into a voltage that is measured by a first sense amplifier 810. Similarly, transformer 812 is coupled between the source and the right current electrode to convert the electrode current into a voltage that is measured by a second sense amplifier 814. Note that the illustrated configuration of transformers 808, 812 couples the primary between the corresponding shield and current electrode, so that current flow from the shield is not included as part of the measured current flow from the current electrodes.

Source 806 is coupled to the right electrode and left electrode through transformers 808, 812. Right electrode 506 and left electrode 508 inject an excitation current into the formation, creating a voltage difference in the formation that is measured by voltage electrodes 504. Current sensors, comprising transformers 808, 812 and amplifiers 810, 814, are coupled to the right electrode and left electrode to measure simultaneous current flows from the two current electrodes. The measured currents may be corrected to compensate for baseline current flow (i.e., the current flow that would be measured if the tool were isolated in a vacuum or in air). In some embodiments, the voltage of each current electrode (relative to the tool body) is measured and multiplied by a vacuum calibration constant to determine the baseline current from that current electrode. Note that the current electrodes may be at different voltages, causing a different baseline current to be determined for each current electrode. The corrected current values are determined by subtracting each baseline current from the measured current for the respective current electrode, thereby excluding from the measurement the baseline currents.

In addition to current sense amplifiers 810, 814 for the current measurements, measurement circuitry 802 includes detector 816 for each voltage electrode pair to measure the potential difference generated by the formation currents. Detector 816 may take the form of separate sense amplifiers for each voltage electrode, and in alternative embodiments, may take the form of a differential voltage amplifier. In both cases, circuitry 802 may include a digital signal processor to enable digital processing of the measured currents and potential differences. These currents and potential differences are associated with a position on the borehole wall and processed to estimate formation resistivity and permittivity at that position. In some embodiments, the measurement circuitry 802 includes analog envelope and phase detectors to reduce the performance requirements of the digital signal processor.

FIG. 8A shows an illustrative equivalent circuit 820 for a formation. The equivalent circuit 820 includes a capacitance 822 in parallel with a resistance 824. The resulting formation impedance is complex, having a real (resistive) and an imaginary (capacitive) component. By measuring the amplitude and relative phase of the voltage created by a current flow through this equivalent circuit, the resistive and capacitive components can both be determined. For a given electrode configuration, the value of the capacitive component is directly proportional to the permittivity of the formation, enabling a straightforward determination of permittivity from the value of the capacitive component.

The equivalent circuit 820 may be a part of a larger equivalent circuit configuration that more accurately models the measurement configuration of a sensor pad 502. For example, FIG. 8B shows one equivalent circuit model 830 having three complex impedance values $Z_1$, $Z_2$, and $Z_3$ to model the measurement configuration of sensor pad 502. The first impedance $Z_1$ represents the losses through the pad body (which are greatly reduced by the use of guard electrodes), and may be expected to have a resistance on the order of $10^6$ ohms and a capacitance on the order of $10^{-8}$ farads. The second impedance, which is shown split in two, represents the contact impedance with half between the formation and the left current electrode, and half between the formation and the right current electrode. The second impedance may be expected to have a resistance in the range between $10^3$ and $10^6$ ohms, and a capacitance in the range between $10^{-9}$ and $10^{-11}$ farads. The third impedance $Z_3$ is shown coupled between the first and second halves of the contact impedance $Z_2$, and it represents the formation impedance between the current electrodes. (In practice the voltage drop across a given fraction of this impedance will be detected between the voltage electrodes.) Impedance $Z_3$ will have a resistance that varies with formation resistivity approximately as $R=\rho/G$ (where G is a tool-dependent geometric factor with a typical value of approximately 10 m), and a capacitance that varies with formation permittivity approximately as $C=\epsilon\epsilon_0/G$. The resistive portions of the impedances may be expected to dominate measurements below about 2-5 kHz, with the capacitive components assuming a more significant role as the measurement frequencies increase beyond about 2-5 kHz.

More complex equivalent circuit models are possible and may be used to more accurately model the measurement configuration. For example, the differential voltage amplifier 816 (FIG. 7) may be represented by its characteristic input impedances to ground, and the impedance of the mud layer in front of each voltage electrode may be added to the equivalent circuit. However, at some point, the added complexity fails to improve system performance, as the marginal gains in accuracy become offset by increases in effort to solve for the model parameters. For example, if the input impedance to the differential voltage amplifier 816 is sufficiently large, the effects of the mud layer impedance on the voltage electrode measurements can be largely discounted. For explanatory purposes, equivalent circuit 820 will be sufficient.

A processor may be provided as part of measurement circuitry 802 to calculate formation resistivity and permittivity values. Alternatively, current and voltage measurements may be communicated to surface computing facilities to calculate resistivity and permittivity values. To enable measurements of the formation resistivity, the relative phase between the current and voltage measurements are included in the evaluation. The resistivity estimate can be expressed as a function $f$:

$$R=f(V, I_{TEST}, \alpha) \tag{1}$$

where $I_{TEST}$ is the test current calculated by averaging $I_{LE}$ (the current flow from the left current electrode) and $I_{RE}$ (the current flow to the right current electrode), V is the voltage measured between the voltage electrodes, and $\alpha$ is the phase angle. The function can take a number of forms depending on experimentally measured sensor pad characteristics and equivalent circuit models of the formation. The equivalent circuit model captures the interplay of the capacitive and resistive effects, enabling the resistive and capacitive contributions to be separated. For example, the measured voltage V can be expressed as a function of current $I_{TEST}$:

$$V = I_{TEST} * Z_3 = I_{TEST}\left(\frac{R - j\omega CR^2}{1 + \omega^2 C^2 R^2}\right) \quad (2)$$

where $Z_3$ (FIG. 8B) is modeled as a resistance R in parallel with a capacitance C (FIG. 8A). It is noted that with two unknowns (R and C) and two equations (in-phase and quadrature components), the resistivity and capacitance can be found. However, if the measured voltage is used as the independent variable, the two unknowns are much easier to calculate:

$$I_{TEST} = V * Y_3 = V\left(\frac{1}{R} + j\omega C\right) \quad (3)$$

where $Y_3$ is the inverse of $Z_3$. When split into real and imaginary parts, $$Re\{I_{TEST}\} = I_{TEST} \cos \alpha = V/R$$

$$Im\{I_{TEST}\} = I_{TEST} \sin \alpha = V(\omega C) \quad (4)$$

which reduces to:

$$R = V/(I_{TEST} \cos \alpha) \quad (5)$$

$$C = (I_{TEST} \sin \alpha)/\omega V \quad (6)$$

It is noted that the resistivity $\rho$ and the relative permittivity $\epsilon$ are proportional to the estimated resistance R and capacitance C:

$$\rho = G \cdot V/(I_{TEST} \cdot \cos(\alpha)), \quad (7)$$

$$\epsilon = (1/\epsilon_0) \cdot G \cdot (I_{TEST} \sin(\alpha))/\omega V, \quad (8)$$

where G is a geometric coefficient based on the current distribution in space. The value of geometric factor G may be estimated numerically or solved for experimentally and then utilized as the constant factor that relates resistivity to resistance. The geometric factor G is calculated when calibrating tool 34.

Figure 9:
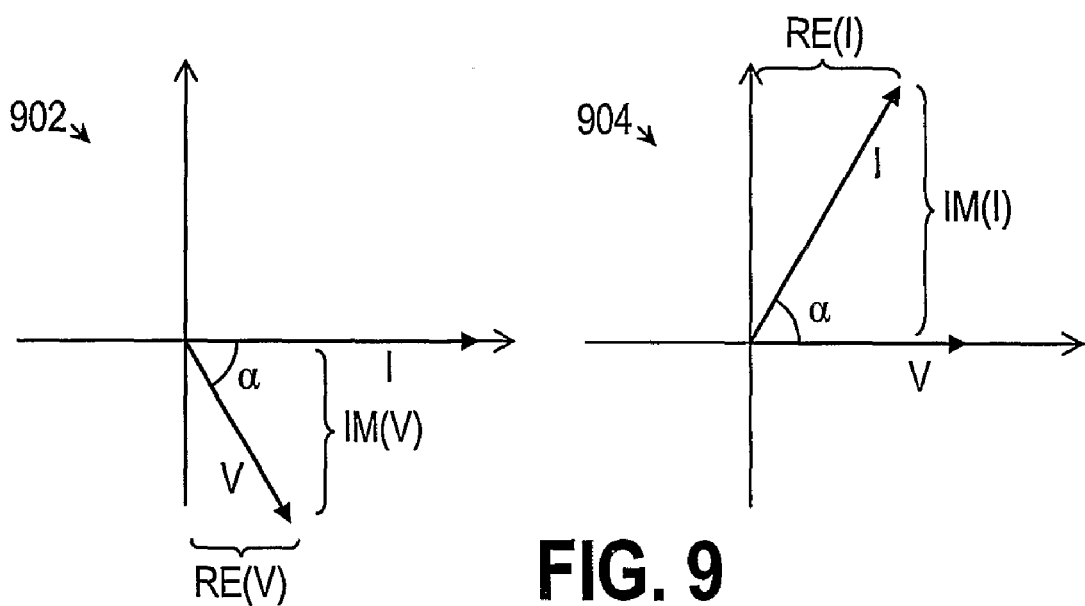
FIG. 9 compares illustrative vector diagrams for impedance and admittance measurements.

FIG. 9 shows a first graph 902 of the phasor relationship between current and voltage in the complex plane, with the phase of the voltage being measured relative to the current. (It is noted that the phase of the current and voltage signals may each be individually measured with respect to given reference signal, and thereafter the phase difference of the current and voltage signals may be calculated with phase of the voltage signal being displayed relative to the phase of the current signal.) The in-phase (real) and quadrature (imaginary) components of the measured voltage do not have a simple relationship to the desired resistivity and permittivity values (see equation (2) above). The second graph 904 again shows the relationship between the voltage and the current, but with the phase of the current being measured relative to the voltage. Measuring in-phase and quadrature components in this fashion enables a straightforward calculation of resistivity and permittivity from the equivalent circuit model 830 per equations (7)-(8).

Figure 10:
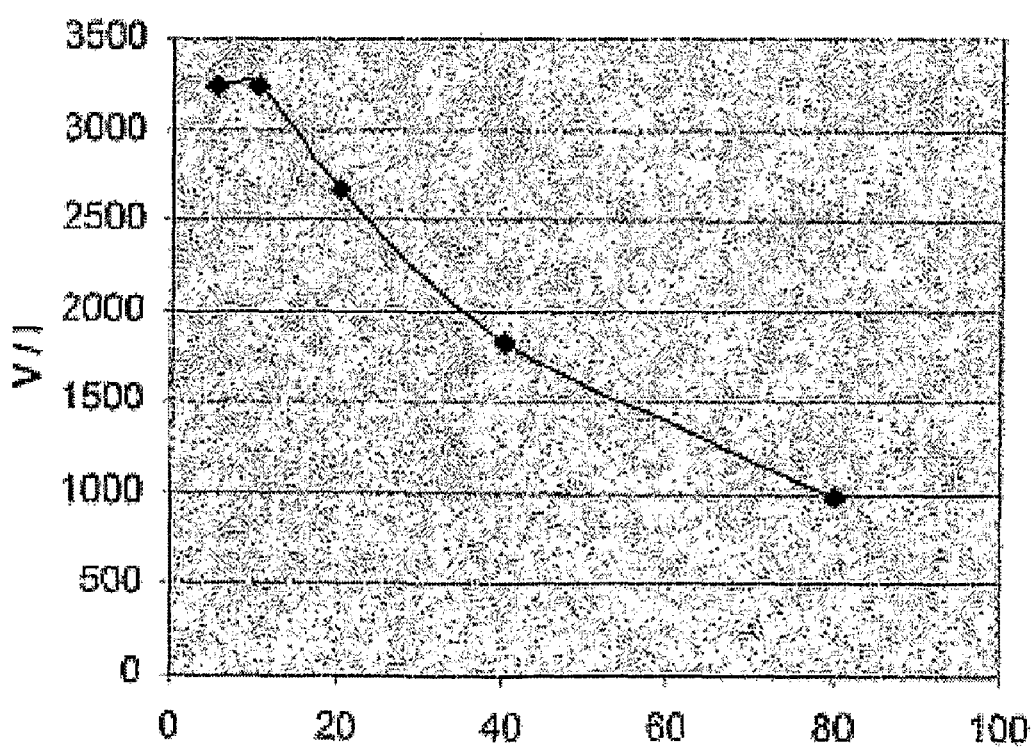
FIG. 10 shows experimental data having a frequency dependence.

Experimental current and voltage measurements have been made with a prototype tool. FIG. 10 shows the magnitude of the impedance, |V|/|I|, as a function of frequency. At low frequencies, the resistive component dominates, causing the impedance to appear relatively constant. At higher frequencies, the capacitive component dominates, causing the impedance to exhibit a $1/\omega$ dependence. This dependence may be exploited to enable a more accurate estimation of the capacitive component, and in turn, a more accurate estimate of relative permittivity.

Figure 11:
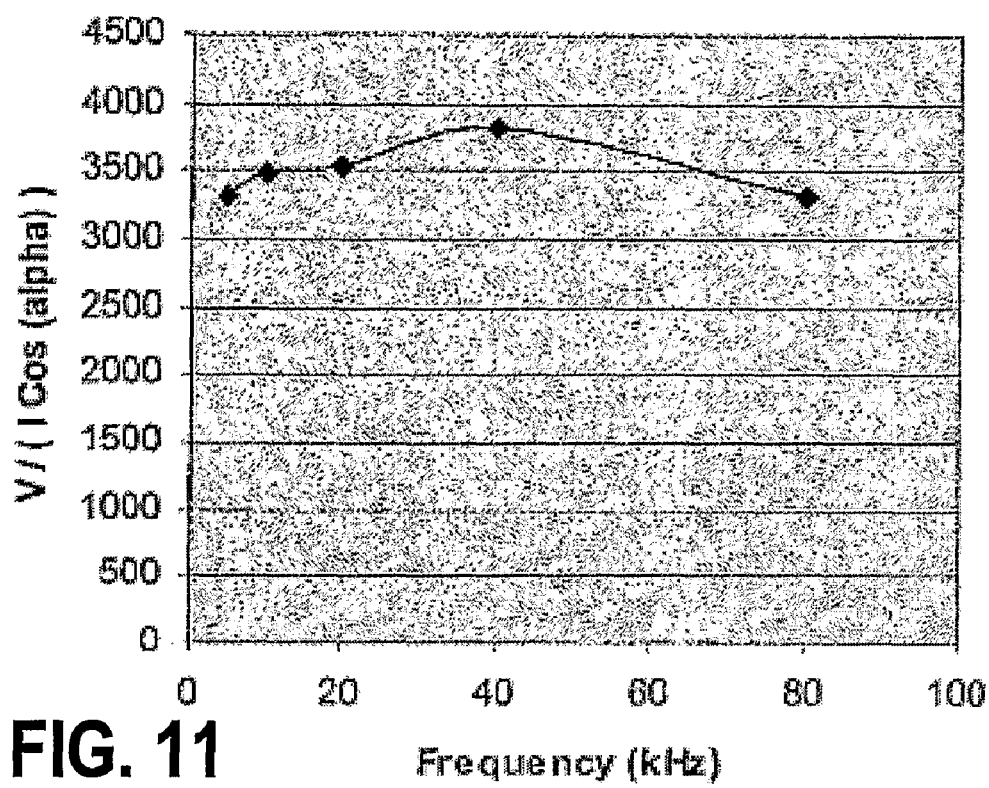
FIG. 11 is a graph of compensated resistivity measurements.
Figure 12:
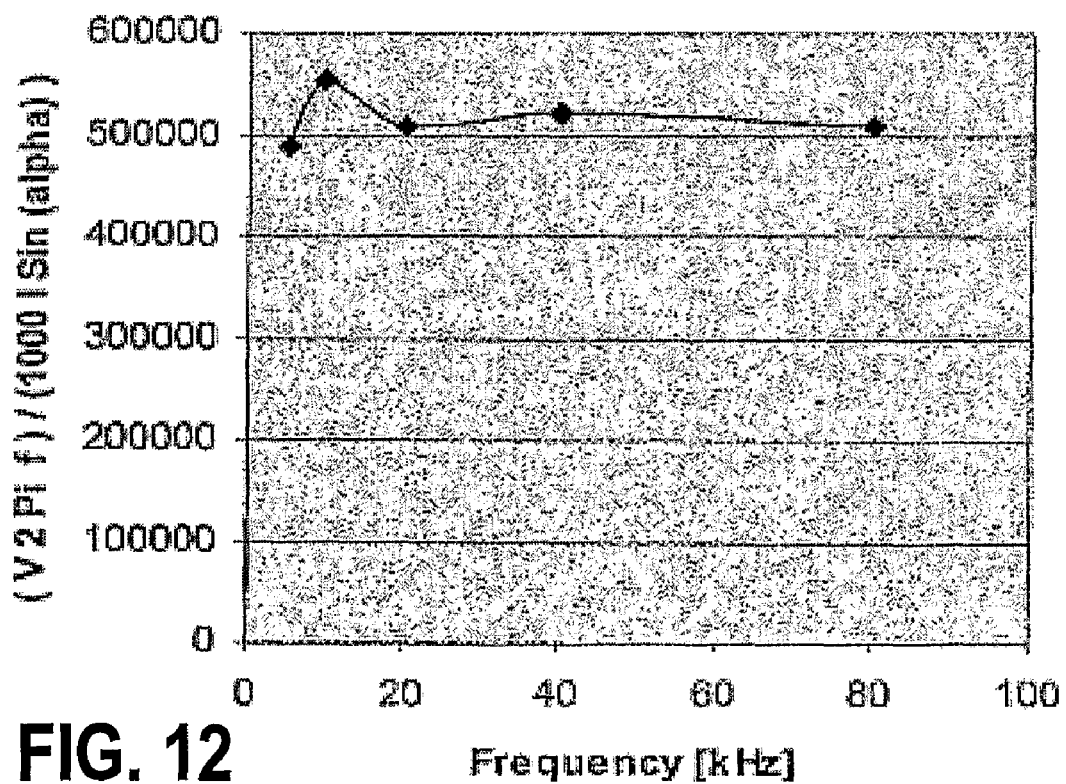
FIG. 12 is a graph of compensated reactance measurements.

FIG. 11 shows a graph of equation (5) as a function of frequency as calculated from the experimental measurements. It is observed that accounting for the phase angle $\alpha$ between current and voltage signals largely compensates for the frequency dependence, providing a relatively frequency-independent measure of resistance. If desired the various resistance measurements may be averaged together and used as the basis of a formation resistivity measurement Similarly, FIG. 12 shows a graph of (the inverse of) equation (6) as a function of frequency as calculated from the experimental measurements. The accounting for phase angle $\alpha$ largely compensates for the frequency dependence, providing a relatively frequency independent measure of capacitance. If desired, the various capacitance measurements may be averaged together and used as the basis of a formation permittivity measurement.

It is noted that in some embodiments, measurements are performed at multiple frequencies and the relative constancy of resistance and capacitance estimates is used as an indication of the equivalent circuit model accuracy. Where the calculations based on a given model fail to adequately account for frequency dependence, the model may be updated to add additional equivalent circuit components to provide such compensation and thereby improve measurement accuracy.

Figure 13:
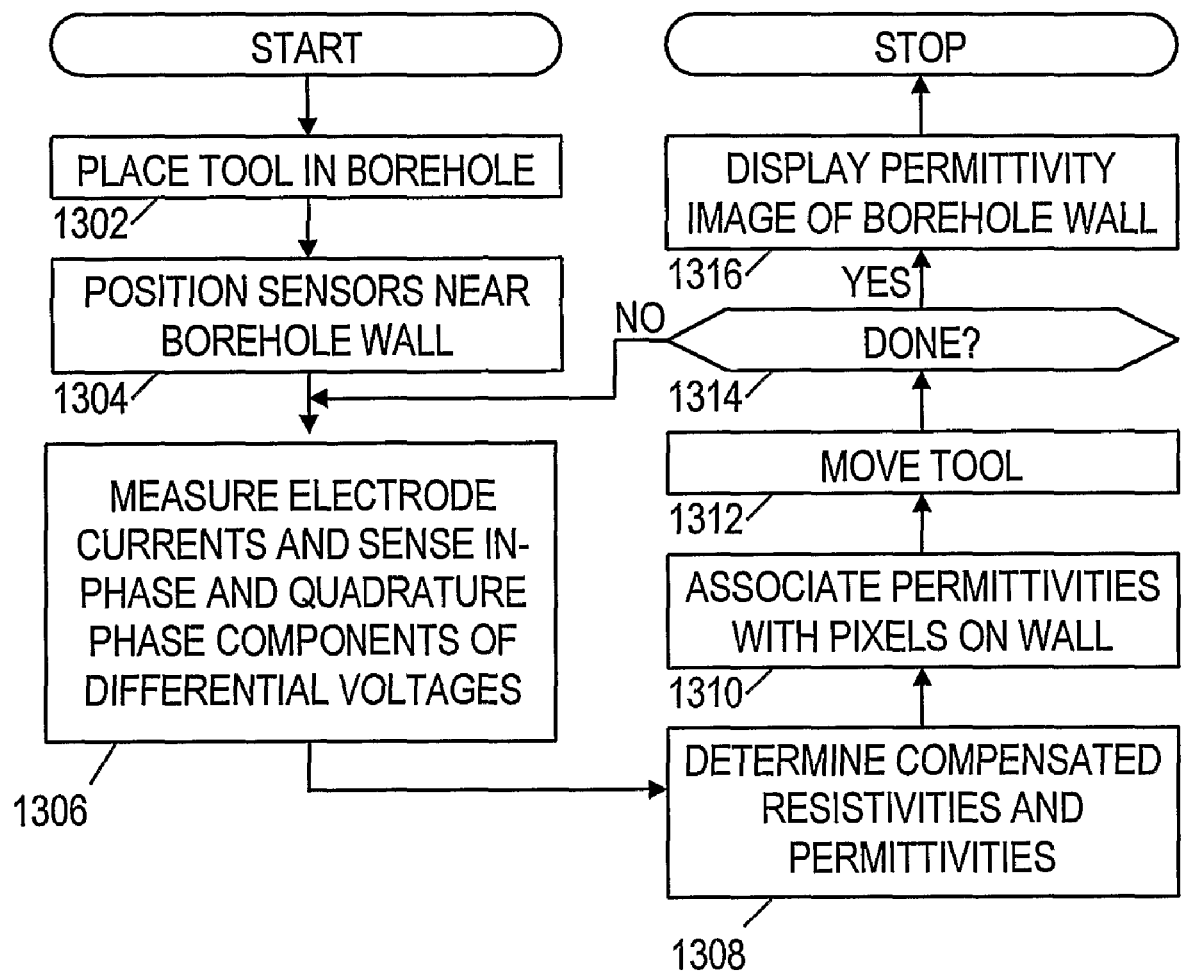
FIG. 13 is a flow diagram of an illustrative imaging method with permittivity measurements.

FIG. 13 shows a flow diagram of an illustrative logging method. In block 1302, a resistivity imaging tool is placed in a borehole. For LVD, the tool is part of the bottom hole assembly and is used to perform logging as drilling operations are performed. For wireline logging, the tool is part of a sonde that is lowered to the bottom of the region of interest to perform logging as the logging tool is pulled uphole at a steady rate.

In block 1304, the tool is placed in logging mode. For LWD, this operation may (or may not) involve deploying a de-centralizer that forces sensors in the tool body against the borehole wall. Alternatively, the LWD resistivity imaging tool may have one or more sensor pads that are deployed against the borehole wall. For wireline logging, multiple sensor pads are deployed against the borehole wall.

Blocks 1306-1314 represent operations that occur during the logging process. Though shown and described in a sequential fashion, the various operations may occur concurrently, and moreover, they may simultaneously occur for multiple voltage electrode pairs and multiple sensor pads. In block 1306 the tool drives a current signal at multiple frequencies between the current electrodes. In some embodiments, the tool cycles sequentially through a set of different frequencies. In other embodiments, the current signal provides power at multiple frequencies simultaneously. As the tool energizes the formation via the current electrodes, the tool measures the amplitude and relative phase of the differential voltages between the various voltage electrode pairs. For the sequential multi-frequency embodiments, differential voltage measurements are made for each frequency. For the simultaneous multi-frequency embodiments, the differential voltage measurements may be filtered or transformed to obtain the amplitude and phase response for each frequency.

In block 1308, the tool determines a resistivity and permittivity measurement for each voltage electrode pair in accordance with equations (7) and (8). In making the measurements, some tool embodiments determine the test current $I_{TEST}$ by combining the measurements from current sensors 810 and 814 (FIG. 7). In addition, some tool embodiments may make and combine multiple amplitude and phase measurements of the differential voltages at a given frequency, and combine the multiple measurements to obtain an averaged amplitude and phase measurement to use as the basis for calculating resistivity and permittivity. Such averaging may improve the signal to noise ratio and thereby improve measurement accuracy.

Still further, some tool embodiments may combine permittivity measurements from different voltage electrode pairs, thereby trading off spatial resolution for increased measurement accuracy. In yet other tool embodiments, permittivity measurements made at different frequencies may be combined to further improve measurement accuracy. Alternatively, permittivity measurements made with different signal frequencies may by analyzed to provide an indication of the quality of the permittivity estimate (consistent estimates indicate higher quality), and may be used to further refine the equivalent circuit model if the measurements exhibit a consistent frequency dependence.

In one variation of the measurement calculation, absolute voltage amplitude and phase measurements are made for each current and voltage electrode. With the additional information made available by this approach, the mud layer impedances (represented in equivalent circuit 830 by impedance $Z_2$), are measured and used along with the voltage measurements to determine measurement corrections. The measurement corrections account for residual leakage currents and measurement variations caused by changes in mud impedance. In some embodiments, the measurement corrections are applied directly to the current and/or voltage measurements, while in alternative embodiments, the corrections are accounted for in solving the equivalent circuit model for the formation impedance $Z_3$.

In block 1310, the tool, or more likely, the surface logging facility coupled to the tool, associates the compensated resistivity and permittivity measurements with a tool position and orientation measurement, thereby enabling a determination of borehole wall image pixel values. In block 1312, the tool moves along the borehole, and in block 1314, a check is performed to determine whether logging operations should continue (e.g., whether the logging tool has reached the end of the region of interest). For continued logging operations, blocks 1306-1314 are repeated. Once logging operations are complete, the surface logging facility maps the permittivity measurements into borehole wall image pixels and displays a permittivity image of the borehole wall in block 1316.

What follows is a discussion of the range of preferred measurement frequencies and the potential permittivity measurement sensitivity for certain tool embodiments. Equation (3) can be rewritten $$Y_3 = G\left(\frac{1}{\rho} + j\omega\varepsilon_0\varepsilon\right) \quad (9)$$

where G is a geometric coefficient based on the current distribution in space, $\rho$ is the formation resistivity, and $\varepsilon$ is the relative permittivity of the formation. The relative phase angle $\alpha$ can be readily verified to be $$\alpha = \arctan(\rho \cdot (\omega\varepsilon_0\varepsilon)) \quad (10)$$

Positing a formation resistivity of 10 $\Omega$m, a measurement frequency of 600 kHz, and a free space permittivity of 8.8× $10^{-12}$ F/m, the minimum measurable relative permittivity is approximately:

$$\varepsilon = (\rho\omega\varepsilon_0)^{-1}\tan(\Delta\alpha) \approx 3000\tan(\Delta\alpha) \approx 52\Delta\alpha \quad (11)$$

where $\Delta\alpha$ is the resolution of the phase angle measurement in degrees and the approximation is good for small angles (<25°). Assuming an angular resolution of 1°, the minimum measurable relative permittivity is about 52. With a more conductive formation (1 $\Omega$m), the approximation becomes $$\varepsilon \approx 520\Delta\alpha \quad (12)$$

or about 520 with an angular resolution of 1°. With a lower interrogation frequency of 300 kHz or a poorer angular resolution of 2°, these minimum permittivity values double. Though these relative permittivity values may appear high, the tool sensitivity may nevertheless be adequate for detecting formations having anomalously high permittivity values (in the tens of thousands) which may be indicative of certain types of source rock. If $\varepsilon$=10,000 is taken as the desired minimum detectable permittivity with an angular resolution of 1° in formations with resistivities of 10 $\Omega$m or more, the interrogation frequency for permittivity measurements may be set as low as 20 kHz. Of course, with more resistive formations, or improved angular resolution (which may be obtainable by combining multiple measurements), suitable interrogation frequencies may fall even below 5 kHz.

Thus it may be desired to have a tool that makes measurements with a range of source frequencies, preferably ranging from below about 5 kHz to above about 500 kHz. Some embodiments will employ at least three different measurement frequencies. It is noted that permittivity estimates from different frequencies may be combined to obtain an improved estimate. Such a combination could take the form of a weighted average, with greater weighting being place on the estimates at higher frequencies which may be expected to be more accurate. Permittivity measurements for some tools may exhibit a trend or frequency dependence that may be modeled, and a curve fit technique may be employed to refine the permittivity estimate.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, though the disclosure and claims use the term "resistivity", it is widely recognized that conductivity (the inverse of resistivity) has a one-to-one correspondence with resistivity and, consequently, often serves as a functional equivalent to resistivity. Capacitance and relative permittivity are directly proportional to each other, and hence some systems may use one as a functional equivalent for the other. Accordingly, the scope of protection is not limited to the embodiments described herein, but is only limited by the claims which follow, the scope of which shall include all equivalents of the subject matter of the claims.

What is claimed is:

1. A logging method that comprises:
    creating an oscillatory electric field in a wall of a borehole using at least two current electrodes of a sensor array, wherein the borehole is filled with a nonconductive fluid;

measuring a differential voltage phase and magnitude with at least two voltage electrodes positioned between the at least two current electrodes;

using the differential voltage phase and magnitude and a current flow magnitude to determine a permittivity measurement that is associated with a position on the borehole wall; and forming a borehole wall image from multiple such permittivity measurements.

2. The method of claim 1, wherein the differential voltage phase and a current flow phase are each measured with respect to a reference signal's phase, and the permittivity measurement is determined based at least in part on a phase difference between the differential voltage phase and the current flow phase.

3. The method of claim 1, wherein said oscillatory electric field is created with multiple frequencies, and wherein said permittivity measurements are each determined from voltage phase and magnitude measurements at different frequencies.

4. The method of claim 1, wherein a permittivity measurement is determined in accordance with $$\epsilon = (1/\epsilon_0) \cdot G \cdot (I_{TEST} \cdot \sin(\alpha))/\omega \cdot \delta V,$$

wherein $\epsilon_0$ is the permittivity of a vacuum, G is a geometric coefficient, $\omega V$ is the differential voltage magnitude, $I_{TEST}$ is the current flow through the formation, $\omega$ is the frequency of $I_{TEST}$, and $\alpha$ is the phase angle.

5. The method of claim 1, further comprising:

determining a measurement indicative of formation resistivity based on the differential voltage phase and magnitude.

6. The method of claim 5, wherein the resistivity measurement is determined in accordance with $$\rho = G \delta V / I_{TEST} \cdot \cos(\alpha),$$

wherein G is a geometric coefficient, $\delta V$ is the differential voltage magnitude, $I_{TEST}$ is the current flow through the formation, and $\alpha$ is the phase angle.

7. The method of claim 1, wherein the oscillatory electric field has a frequency between about 5 kHz and about 100 kHz.

8. The method of claim 1, wherein each of the at least two current electrodes are provided with conductive shields to minimize leakage current from the at least two current electrodes.

9. A logging tool that comprises:

a sensor array having at least two voltage electrodes positioned between at least two current electrodes, wherein the at least two current electrodes are energized to create an oscillatory electric field in a formation forming a wall of a borehole enclosing a nonconductive borehole fluid;

a voltage detector coupled to the at least two voltage electrodes to measure a differential voltage phase and magnitude induced by the electric field; and a processor in communication with the voltage detector and at least one current sensor to determine a measurement indicative of formation permittivity based at least in part on the differential voltage phase and magnitude;

wherein multiple such measurements indicative of formation permittivity are associated with positions on the borehole wall and are combined to form a borehole wall image.

10. The tool of claim 9, wherein the oscillatory electric field is created with multiple frequencies, and wherein said measurements indicative of formation permittivity are each determined from voltage phase and magnitude measurements at multiple frequencies.

11. The tool of claim 10, wherein said measurements are determined in accordance with $$\epsilon = (1/\epsilon_0) \cdot G \cdot (I_{TEST} \sin(\alpha))/\omega \cdot \delta V,$$

wherein $\epsilon_0$ is the permittivity of a vacuum, G is a geometric coefficient, $\delta V$ is the differential voltage magnitude, $I_{TEST}$ is the total current flow through the formation, $\omega$ is the frequency of $I_{TEST}$, and $\alpha$ is the phase angle.

12. The tool of claim 9, wherein the processor determines a measurement indicative of formation resistivity based on the differential voltage phase and magnitude.

13. The tool of claim 12, wherein the measurement indicative of formation resistivity is determined in accordance with:

$$\rho = G \delta V / I_{TEST} \cdot \cos(\alpha),$$

wherein G is a geometric coefficient, $\delta V$ is the differential voltage magnitude, $I_{TEST}$ is the current flow through the formation, and $\alpha$ is the phase angle.

14. The tool of claim 9, wherein the oscillatory electric field has a frequency between about 5 kHz and about 100 kHz.

15. The tool of claim 9, wherein each of the at least two current electrodes are provided with a corresponding conductive shield to minimize leakage current from the at least two current electrodes.

\* \* \* \* \*